(12) United States Patent
Yoshimura et al.

(10) Patent No.: US 8,132,593 B2
(45) Date of Patent: Mar. 13, 2012

(54) PILOT-OPERATED THREE-PORT VALVE

(75) Inventors: Shinichi Yoshimura, Tsukubamirai (JP);
Kenichi Matsumura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 959 days.

(21) Appl. No.: 12/041,408

(22) Filed: Mar. 3, 2008

(65) Prior Publication Data

US 2008/0223466 A1 Sep. 18, 2008

(30) Foreign Application Priority Data

Mar. 13, 2007 (JP) ................................. 2007-064011

(51) Int. Cl.
*F16K 11/044* (2006.01)
(52) U.S. Cl. ...................................... 137/625.5; 251/87
(58) Field of Classification Search ............. 137/625.48, 137/625.5; 251/84, 85, 86, 87, 88
See application file for complete search history.

(56) References Cited

U.S. PATENT DOCUMENTS

| | | | | |
|---|---|---|---|---|
| 1,799,667 A | * | 4/1931 | Ziegler ............................ | 251/87 |
| 3,356,083 A | * | 12/1967 | Clark et al. .............. | 123/406.69 |
| 3,511,260 A | * | 5/1970 | Benjamin ................ | 137/119.09 |
| 4,176,687 A | * | 12/1979 | Ensign ..................... | 137/625.65 |
| 4,270,727 A | * | 6/1981 | Norman ......................... | 251/63.4 |
| 2007/0007474 A1 | | 1/2007 | Hayashi et al. | |

FOREIGN PATENT DOCUMENTS

| | | |
|---|---|---|
| DD | 216 994 | 1/1985 |
| DE | 85 06 702 | 5/1985 |
| GB | 1161344 A | 8/1969 |
| JP | 52-166823 | 12/1977 |
| JP | 58-114957 | 8/1983 |
| JP | 2002-071033 | 2/2002 |
| JP | 2002-71033 | 3/2002 |
| JP | 2002-371589 | 12/2002 |
| JP | 2004-237751 | 8/2004 |
| JP | 2005-299873 | 10/2005 |

* cited by examiner

*Primary Examiner* — John Fox
(74) *Attorney, Agent, or Firm* — Oblon, Spivak, McClelland, Maier & Neustadt, L.L.P.

(57) ABSTRACT

A pilot-operated three-port valve includes three ports, two valve seats that are concentric and opposite each other, a poppet-type valve member that is disposed between these two valve seats, and a pilot operating portion that opens and closes the valve member using a rod. Seat surfaces of the two valve seats and a first seal surface and a second seal surface of the valve member are flat. The valve member is attached to an end of the rod coaxially with the rod and so as to have a degree of freedom of inclination from the axis of the rod.

14 Claims, 3 Drawing Sheets

PILOT-OPERATED THREE-PORT VALVE

TECHNICAL FIELD

The present invention relates to a pilot-operated three-port valve that includes three ports, two valve seats formed between these ports, and a poppet-type valve member opening and closing these valve seats and that is configured to open and close this valve member by the action of pilot fluid pressure.

BACKGROUND ART

A pilot-operated three-port valve is known as disclosed, for example, in Japanese Unexamined Patent Application Publication No. 2002-71033. This three-port valve includes three ports, two ring-shaped valve seats that are formed between these ports and that are concentric and opposite each other, a poppet-type valve member that is disposed between these two valve seats, and a pilot operating portion that opens and closes this valve member. This three-port valve is configured to open and close the valve member using a piston with a rod therebetween. The piston operates by the action of pilot fluid pressure of the pilot operating portion.

As described above, this type of three-port valve opens and closes two valve seats that are concentric and opposite each other using a single valve member therebetween. Therefore, in order to improve the sealing performance when either of the valve seats is closed, it is important that the ring-shaped seat surfaces of the two valve seats are parallel to each other and each seat surface and the corresponding seal surface of the valve member are parallel to each other.

However, in this type of three-port valve, due to a slight error during fabrication or assembly of components, the seat surfaces of the two valve seats are not always completely parallel to each other, and/or each seat surface and the corresponding seal surface of the valve member are not always completely parallel. In such a case, uneven contact between the valve member and the valve seats accelerates wear and tends to deteriorate sealing performance.

DISCLOSURE OF INVENTION

Accordingly, an object of the present invention is to provide a three-port valve that can always reliably seal two opposite valve seats using a valve member between these valve seats and therefore has excellent sealing performance.

To attain this object, a pilot-operated three-port valve of the present invention includes three ports including first, second, and third ports; two valve seats including first and second valve seats that are formed in a channel connecting these ports and that are concentric and opposite each other; a poppet-type valve member that is disposed between these two valve seats and that operates so as to open one of the valve seats when the other is closed; a rod connected to this valve member; and a pilot operating portion that opens and closes the valve member using the rod by the action of pilot fluid pressure. The first valve seat and the second valve seat have ring-shaped flat seat surfaces, respectively. The valve member is short-cylindrical in shape and is attached to an end of the rod coaxially and so as to have a degree of freedom of inclination from the axis of the rod. Both end faces in the axial direction of the valve member form a first seal surface and a second seal surface that are flat and that come into and out of contact with the seat surfaces of the valve seats.

Since the seat surfaces of the two valve seats and the valve seal surfaces of the valve member are flat and the valve member is attached to the rod so as to have a degree of freedom of inclination, each seal surface can be brought into contact with the corresponding seat surface parallel and evenly due to the degree of freedom of the valve member if the seat surfaces of the two valve seats are not completely parallel to each other and/or each seat surface and the corresponding seal surface of the valve member are not completely parallel due to a slight error during fabrication or assembly. Consequently, the three-port valve of the present invention has high sealing performance.

In the present invention, it is preferable that the valve member have a non-through rod fitting hole formed in the first seal surface along the axis of the valve member, an end portion of the rod be inserted in the fitting hole with an O-ring therebetween airtightly and inclinably, a pin insertion hole be formed in the valve member and the end portion of the rod so as to penetrate through the valve member and the end portion of the rod in a direction perpendicular to the axis of the rod at a position nearer the end of the rod than the O-ring, a locking pin be inserted in this pin insertion hole, and the valve member be connected by this locking pin to the rod so as to have the degree of freedom.

In this case, it is preferable that a ring fitting groove be formed in the outer circumferential surface of the valve member so as to cross the openings of the pin insertion hole and so as to surround the valve member, a clamp ring be fitted in this ring fitting groove so as to surround the valve member, and this clamp ring clamp each end of the locking pin, thereby preventing the locking pin from coming out of the pin insertion hole.

In the present invention, the ports may be formed in a valve housing, the first valve seat and the second valve seat may be formed in a first valve seat block and a second valve seat block, respectively, that are formed separately from the valve housing, these valve seat blocks may be fitted to the housing, and these valve seat blocks may be compatible with each other with respect to the structure for fitting to the housing and the performance in sealing of the valve seats by the first seal surface or the second seal surface of the valve member.

In this case, it is preferable that the valve housing include a first housing member having the first port and the second port and a second housing member having the third port and be formed by connecting these housing members, the first valve seat block be attached to the first housing member, and the second valve seat block be attached to the second housing member.

BEST MODE FOR CARRYING OUT THE INVENTION

Figure 1:
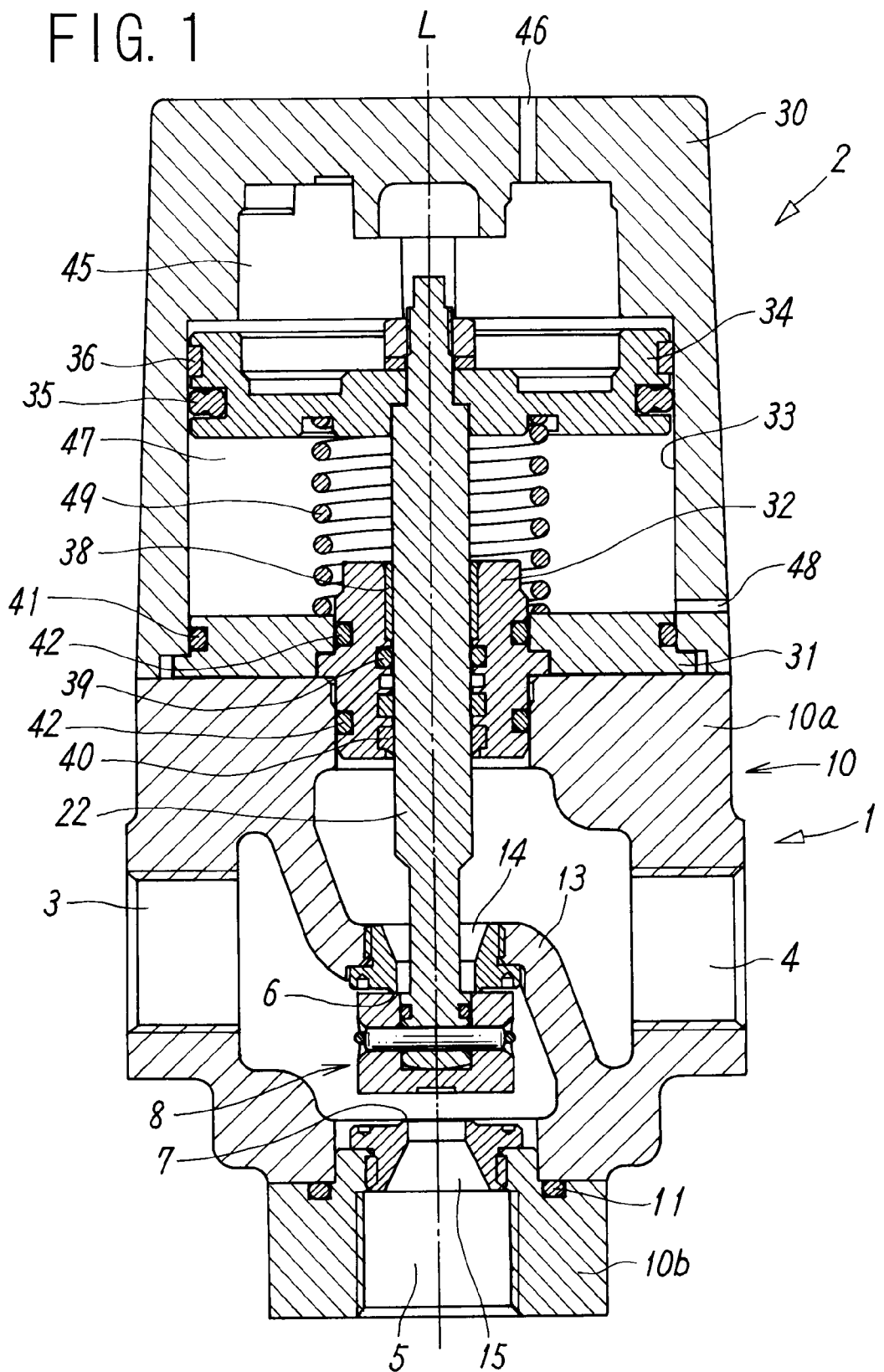
FIG. 1 is a sectional view of a three-port valve according to the present invention.
Figure 2:
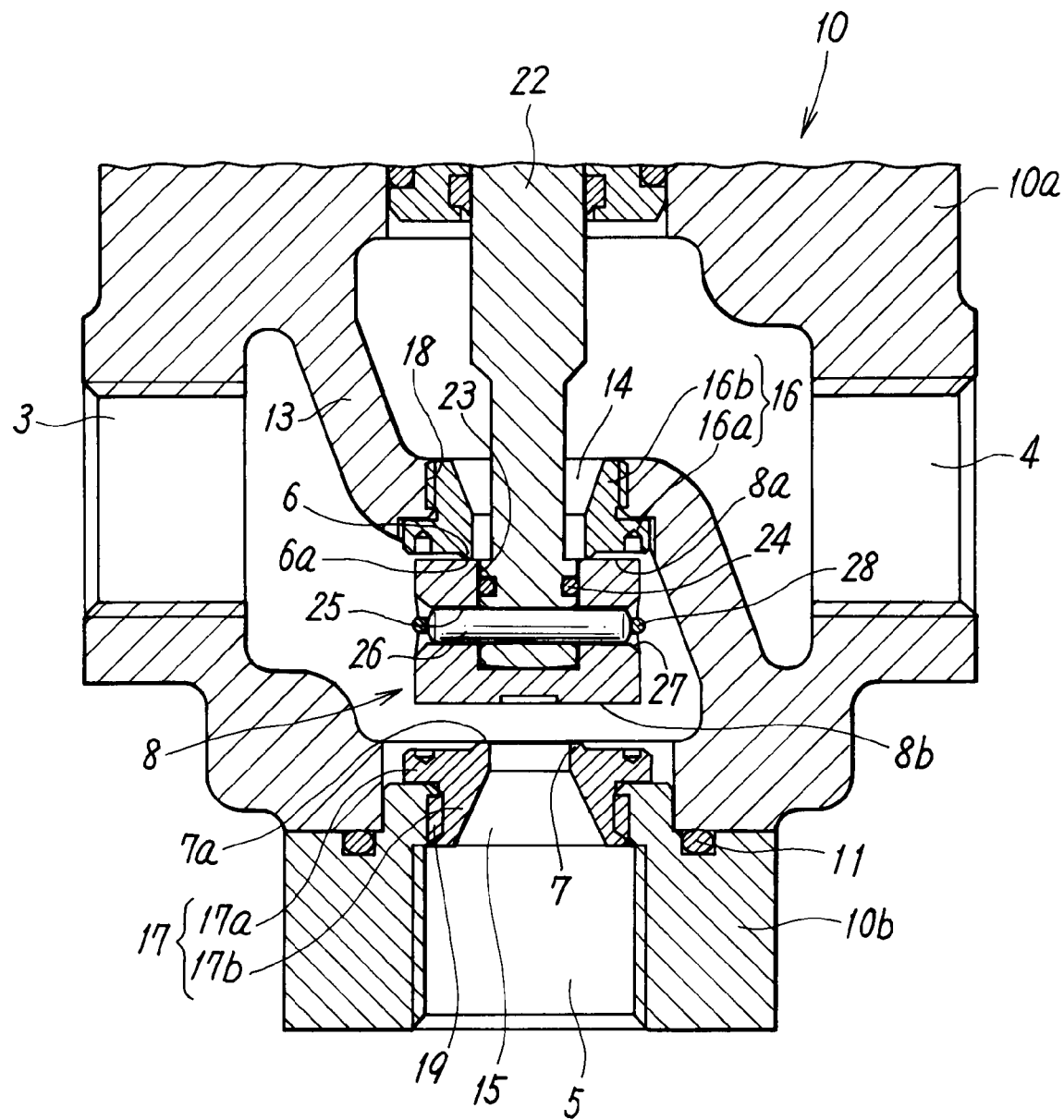
FIG. 2 is an enlarged view of the relevant part of FIG. 1.
Figure 3:
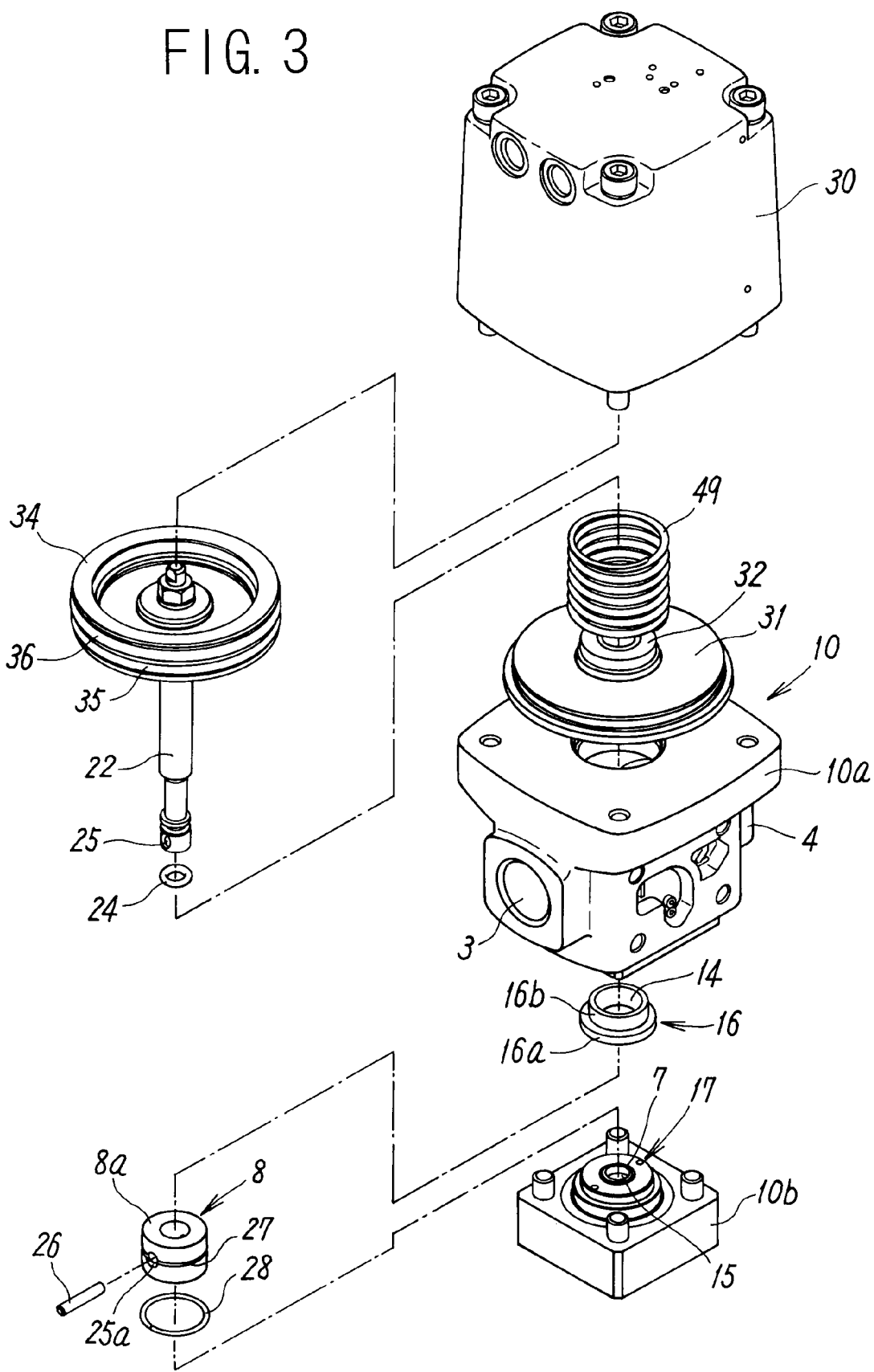
FIG. 3 is an exploded perspective view of FIG. 1.

FIGS. 1 to 3 show an embodiment of a pilot-operated three-port valve according to the present invention. This three-port valve includes a directional control valve portion 1 that opens and closes two valve seats 6 and 7 formed between three ports 3, 4, and 5 using a single poppet-type valve member 8, and a pilot operating portion 2 that opens and closes the valve member 8 by the action of the pilot fluid pressure. The directional control valve portion 1 and the pilot operating portion 2 are integrally connected along the valve axis L that is the central axis of the three-port valve.

The directional control valve portion 1 has a hollow valve housing 10. This housing 10 includes a first housing member 10a located adjacent to the pilot operating portion 2 and a second housing member 10b integrally connected to the underside of the first housing member 10a with a seal member 11 therebetween. The first port 3 and the second port 4 are formed in two opposite side surfaces of the first housing member 10a so as to be located concentrically and so as to open in opposite directions, that is, in directions different by 180 degrees. In the underside of the second housing member 10b, the third port 5 is formed so as to open downward along the valve axis L. In this embodiment, the first port 3 is an input port, and the second and third ports 4 and 5 are output ports.

In the middle of the channel connecting the first port 3 and the second port 4, a bulkhead 13 having a channel hole 14 is provided. In this bulkhead 13, the first valve seat 6 surrounding the channel hole 14 is formed. In the middle of the channel connecting the first port 3 and the third port 5, the second valve seat 7 surrounding a channel hole 15 is formed. The seat surfaces 6a and 7a of the first valve seat 6 and the second valve seat 7 are ring-shaped flat surfaces. These seat surfaces 6a and 7a are disposed on the valve axis L concentrically, parallel, and opposite each other.

The first valve seat 6 and the second valve seat 7 are formed in a first valve seat block 16 and a second valve seat block 17, respectively, that are formed separately from the valve housing 10. These valve seat blocks 16 and 17 are attached to the valve housing 10. On this point, a more detailed description will be provided. The valve seat blocks 16 and 17 are short-cylindrical members having the channel holes 14 and 15, respectively, therein. The valve seat blocks 16 and 17 have large-diameter main body portions 16a and 17a, respectively, and small-diameter fitting portions 16b and 17b, respectively. The valve seats 6 and 7 are formed in the centers of the upper surfaces of the large-diameter main body portions 16a and 17a, respectively, so as to protrude therefrom. The small-diameter fitting portions 16b and 17b each have a thread formed in the outer circumferential surface thereof. By screwing these fitting portions 16b and 17b into a screw hole 18 formed in the bulkhead 13 of the first housing member 10a and a screw hole 19 formed in the second housing member 10b, respectively, these valve seat blocks 16 and 17 are fitted to the valve housing 10.

The first valve seat block 16 and the second valve seat block 17 may differ in structure and may be incompatible, but preferably have the same structure and are preferably compatible. This makes it possible to fit these valve seat blocks 16 and 17 to either of the bulkhead 13 and the second housing member 10b. In this case, the valve seat blocks 16 and 17 do not always have to have the same structure. They have only to be compatible with each other with respect to, at least, the structure for fitting to the valve housing 10 and the performance in sealing of the valve seats 6 and 7 by the first seal surface 8a or the second seal surface 8b of the valve member 8.

Between the two opposite valve seats 6 and 7, the valve member 8 is disposed. This valve member 8 is formed of rubber or synthetic resin, is short-cylindrical in shape, and is attached to one end of a cylindrical rod 22 that extends from the pilot operating portion 2 coaxially with the valve axis L. This valve member 8 is coaxial with the rod 22 and has a degree of freedom of inclination from the axis of the rod 22 (therefore from the valve axis L). At both ends in the axial direction of this valve member 8 are formed a first seal surface 8a that comes into and out of contact with the seat surface 6a of the first valve seat 6 and a second seal surface 8b that comes into and out of contact with the seat surface 7a of the second valve seat 7. When the seal surface 8a closes the valve seat 6, the seal surface 8b opens the valve seat 7. When the seal surface 8b closes the valve seat 7, the seal surface 8a opens the valve seat 6. The seal surfaces 8a and 8b are ring-shaped, flat, and parallel to each other.

Attaching of the valve member 8 to the rod 22 will be further described in detail. As can be seen from FIGS. 2 and 3, in the center of the valve member 8, a non-through circular rod-fitting hole 23 is formed in the first seal surface 8a along the axis of the valve member 8. In this fitting hole 23, one end of the rod 22 is disposed with an O-ring 24 therebetween airtightly and inclinably. A circular pin-insertion hole 25 is formed in the valve member 8 and the end of the rod 22 so as to penetrate through the valve member 8 and the end of the rod in a direction perpendicular to the axis of the rod 22 at a position nearer the end of the rod than the O-ring 24. In this pin-insertion hole 25, a circular locking pin 26 is disposed. The valve member 8 is connected by this locking pin 26 to the rod 22 so as to have the degree of freedom.

Since the valve member 8 is attached to the rod 22 so as to have a degree of freedom of inclination as described above, the seal surfaces 8a and 8b at both ends of the valve member 8 can be brought into contact with the seat surface 6a of the valve seat 6 and the seat surface 7a of the valve seat 7, respectively, parallel and evenly due to the degree of freedom of the valve member 8 if the seat surfaces 6a and 7a of the two valve seats 6 and 7 are not completely parallel to each other and/or the seat surfaces 6a and 7a are not completely parallel to the seal surfaces 8a and 8b, respectively, of the valve member 8 due to a slight error during fabrication or assembly. Coupled with the fact that the seat surfaces 6a and 7a and the seal surfaces 8a and 8b are flat as described above, this gives the three-port valve high sealing performance when either of the valve seats is closed.

In addition, by disposing the O-ring 24 at a position nearer the first seal surface 8a than the pin insertion hole 25, the first port 3 and the second port 4 can be prevented from communicating with each other via the rod fitting hole 23 and the pin insertion hole 25 when the valve member 8 closes the first valve seat 6 as shown in FIGS. 1 and 2.

In the outer circumferential surface of the valve member 8, a ring fitting groove 27 is formed so as to cross the openings 25a of the pin insertion hole 25 and so as to surround the valve member 8. In this ring fitting groove 27, a clamp ring 28 that has elasticity and that is formed of metal or synthetic resin is fitted so as to surround the valve member 8. This clamp ring 28 clamps each end of the locking pin 26, thereby preventing the locking pin 26 from coming out of the pin insertion hole 25. The clamp ring 28 is a split ring having a cut.

Therefore, normally, the locking pin 26 is prevented by this clamp ring 28 from coming out, and the connection between the valve member 8 and the rod 22 is reliably maintained. However, the valve member 8 can be easily removed from the rod 22 by removing the clamp ring 28 and then extracting the locking pin 26 from the pin insertion hole 25.

The above-described pilot operating portion 2 has a cylinder housing 30 that is connected to the valve housing 10 and that is substantially rectangular box-shaped. The end of this cylinder housing 30 adjacent to the valve housing 10 is open. By attaching an end plate 31 and a bearing block 32 to the open end, a piston chamber 33 is formed inside the cylinder housing 30. Inside this piston chamber 33, a piston 34 is housed with a seal member 35 and a guide ring 36 fitted in the outer circumferential surface thereof and so as to be able to be displaced along the valve axis L. To the center of this piston 34, the other end of the rod 22 is connected. The rod 22 is slidably supported by the bearing block 32 with a bearing 38, a seal member 39, and a scraper 40 therebetween.

In the figure, reference numeral 41 denotes a seal member that seals the gap between the end plate 31 and the cylinder housing 30, and reference numeral 42 denotes a seal member that seals the gap between the bearing block 32 and the end plate 31 and a seal member that seals the gap between the bearing block 32 and the valve housing 10.

The chamber behind the piston 34 is a pilot pressure chamber 45, to which pilot fluid such as air is supplied from a pressure fluid source through a pilot port 46 formed in the cylinder housing 30. The chamber 47 in front of the piston 34 is open to the atmosphere through a breathing port 48. In this chamber 47, a return spring 49 is disposed between the piston 34 and the end plate 31. By this return spring 49, the piston 34 is constantly urged in the direction in which the valve member 8 closes the first valve seat 6.

When the valve member 8 closes the first valve seat 6 and opens the second valve seat 7 as shown in FIG. 1, pilot fluid is supplied to the pilot pressure chamber 45. The piston 34 is displaced downward in the figure, and separates the valve member 8 from the first valve seat 6 and presses the valve member 8 against the second valve seat 7 using the rod 22. In this way, the first valve seat 6 is opened and the second valve seat 7 is closed.

When the pilot fluid in the pilot pressure chamber 45 is discharged, the piston 34 and the valve member 8 are returned to their positions in FIG. 1 by the urging force of the return spring 49, and the valve member 8 closes the first valve seat 6 and opens the second valve seat 7.

Since the valve member 8 is attached to the rod 22 so as to have a degree of freedom of inclination, the seal surfaces 8*a* and 8*b* of the valve member 8 are brought into contact with the seat surface 6*a* of the valve seat 6 and the seat surface 7*a* of the valve seat 7, respectively, parallel and evenly when the valve member 8 closes the valve seats 6 and 7. Consequently, the three-port valve has high sealing performance when either of the valve seats is closed.

The invention claimed is:

1. A pilot-operated three-port valve comprising:
three ports including first, second, and third ports;
two valve seats including first and second valve seats that are formed in a channel connecting these ports and that are concentric and opposite each other;
a poppet-type valve member that is disposed between these valve seats and that operates so as to open one of the valve seats when the other is closed;
a rod connected to this valve member; and
a pilot operating portion that opens and closes the valve member using the rod by the action of pilot fluid pressure,
wherein the ports are formed in a valve housing, the first valve seat and the second valve seat are respectively formed in a first valve seat block and a second valve seat block that are formed separately from the valve housing, and wherein these valve seat blocks are fitted to the housing,
wherein the first valve seat and the second valve seat are respectively formed out of ring shaped parts protruding from the first valve seat block and the second valve seat block and have flat seat surfaces in ends of the ring shaped parts,
wherein the valve member is short-cylindrical in shape with a uniform diameter, the valve member integrally having a first seal surface and a second seal surface that come into and out of contact with the seat surfaces of both the valve seats at both end surfaces in the axial direction of the valve member, the valve member has a rod fitting hole extending along the axis of the valve member from the side of the first seal surface, wherein the rod fitting hole does not penetrate to the side of the second seal surface, the end portion of the rod being inserted into the rod fitting hole, an O-ring being provided between the rod fitting hole and the end portion of the rod inserted into the rod fitting hole, whereby the valve member is airtightly and inclinably attached to an end of the rod coaxially and so as to have a degree of freedom of inclination from the axis of the rod, and
wherein the rod is connected to a piston disposed in a piston chamber of the pilot operating portion, the rod passing through a bearing block for separating the piston chamber and the channel slidably and passing through a channel hole of the first valve seat, a rod end portion is connected to the valve member, a diameter of the rod end portion of the rod is smaller than a diameter of a rod base end portion passing through the bearing block, and a diameter of a rod middle portion passing through the channel hole of the first valve seat of the rod is smaller than the diameter of the rod end portion.

2. The three-port valve according to claim 1, wherein the valve member has a pin insertion hole formed in the valve member and the end portion of the rod so as to penetrate through the valve member and the end portion of the rod in a direction perpendicular to the axis of the rod at a position nearer the end of the rod than the O-ring, wherein a locking pin is inserted in this pin insertion hole, and wherein the valve member is connected by this locking pin to the rod so as to have the degree of freedom.

3. The three-port valve according to claim 2, wherein a ring fitting groove is formed in the outer circumferential surface of the valve member so as to cross the openings of the pin insertion hole and so as to surround the valve member, a clamp ring is fitted in this ring fitting groove so as to surround the valve member, and this clamp ring clamps each end of the locking pin, thereby preventing the locking pin from coming out of the pin insertion hole.

4. The three-port valve according to claim 3, wherein the first and second valve seat blocks are compatible with each other with respect to the structure for fitting to the housing and the performance in sealing of the valve seats by the first seal surface or the second seal surface of the valve member.

5. The three-port valve according to claim 4, wherein the valve housing includes a first housing member having the first port and the second port and a second housing member having the third port and is formed by connecting these housing members, the first valve seat block is attached to the first housing member, and the second valve seat block is attached to the second housing member.

6. The three-port valve according to claim 2, wherein the first and second valve seat blocks are compatible with each other with respect to the structure for fitting to the housing and the performance in sealing of the valve seats by the first seal surface or the second seal surface of the valve member.

7. The three-port valve according to claim 6, wherein the valve housing includes a first housing member having the first port and the second port and a second housing member having the third port and is formed by connecting these housing members, the first valve seat block is attached to the first housing member, and the second valve seat block is attached to the second housing member.

8. The three-port valve according to claim 1, wherein the first and second valve seat blocks are compatible with each other with respect to the structure for fitting to the housing and the performance in sealing of the valve seats by the first seal surface or the second seal surface of the valve member.

9. The three-port valve according to claim 8, wherein the valve housing includes a first housing member having the first port and the second port and a second housing member having the third port and is formed by connecting these housing members, the first valve seat block is attached to the first housing member, and the second valve seat block is attached to the second housing member.

10. The three-port valve according to claim 1, wherein the inside diameter of the valve seat surface of the second valve seat is smaller than the inside diameter of the valve seat surface of the first valve seat, and an outer diameter of the valve seat surface of the second valve seat is smaller than the outer diameter of the valve seat surface of the first valve seat.

11. The three-port valve according to claim 10, wherein both the inside and outer diameters of the valve seat surface of the second valve seat are smaller than the inside diameter of the valve seat surface of the first valve seat.

12. A pilot-operated three-port valve comprising:
a valve housing defining first, second and third ports;
first and second concentric flat valve seats provided in a channel in said housing, said channel connecting said ports;
a valve member disposed between said first and second valve seats;
a rod connected to said valve member, wherein said rod is movable such that said valve member is movable between said first and second valve seats to selectively engage one or the other of said first and second valve seats to close said channel, wherein the valve member comprises a cylinder with first and second seal surfaces at the ends of the cylinder, the valve member further comprising a non-penetrating rod fitting hole extending along the axis of the valve member from the side of the first seal surface, wherein an end portion of the rod is inserted into the rod fitting hole;
a fluid pressure actuated pilot operating portion connected to the rod, whereby the rod is moved by the pilot operating portion to open and close the valve;
a pin insertion hole formed in the valve member and the end portion of the rod so as to penetrate through the valve member and the end portion of the rod in a direction perpendicular to the axis of the rod;
a locking pin inserted in said pin insertion hole, whereby the valve member is inclinably attached to an end of the rod with a degree of freedom of inclination from the axis of the rod; and
an O-ring provided between the rod fitting hole and the end portion of the rod inserted into the rod fitting hole, wherein the pin insertion hole is at a position nearer the end of the rod than is the O-ring, whereby fluid leakage between the pin insertion hole and the first seal surface is prevented.

13. The three-port valve according to claim 12, wherein the valve member is made of an elastomeric material.

14. The three-port valve according to claim 1, wherein the valve member is made of an elastomeric material.

* * * * *